United States Patent Office 3,084,206
Patented Apr. 2, 1963

3,084,206
PRODUCTION OF HEXENES
Alan Arthur Yeo, James Keith Hambling, and Geoffrey Winton Alderson, all of Sunbury-on-Thames, Middlesex, England, assignors to The British Petroleum Company Limited, London, England, a British joint-stock corporation
No Drawing. Filed Mar. 15, 1961, Ser. No. 95,803
Claims priority, application Great Britain Mar. 23, 1960
4 Claims. (Cl. 260—683.15)

This invention relates to a process for the dimerisation of propylene to obtain 4-methylpentene-1.

In British patent specification 824,917 is disclosed a process for dimerising propylene to a hexene product consisting of hexene isomers which comprises reacting propylene in the presence of an alkali metal catalyst at a temperature of from 100° F. to 400° F. and a pressure of from 1 atmosphere to 100 atmospheres. It is stated that the catalyst may be a liquid metal catalyst, metal in a film on an inert support, or a solid metal catalyst. Thus a typical catalyst consisting of potassium metal dispersed on potassium carbonate.

In British patent specification 825,902 it is disclosed that compounds of alkali metals with elemental carbon, the ratio of alkali metal to carbon being 1:8 to 1:64, act as polymerisation agent and in illustration there is described the polymerisation of alpha-methylstyrene to high molecular weight products using a catalyst of the formula $KC_8$.

According to the present invention there is provided a process for the production of 4-methylpentene-1 which comprises maintaining propylene in contact but for short contact time with a catalyst consisting of or containing a lamellar complex of sodium and carbon and having the formula $NaC_{64}$, at a temperature below 140° C.

The production of lamellar complexes is described by R. C. Asher and S. A. Wilson in Nature 1958, vol. 181 at page 409 et seq. and by R. C. Asher in J. Inorg. Nucl. Chem. 1959 vol. 10 at page 238 et seq.

Usually a pre-formed complex of the type hereinbefore described will be brought into contact with propylene; this is not essential if the polymerisation conditions are such that the complex will form in situ and in this case a mixture of sodium and carbon may be contacted with propylene.

The catalyst may consist wholly of the lamellar complex or may consist of or contain a mixture of the lamellar complex with an alkali metal supported on carbon, said mixture containing the lamellar complex in any proportion. The proportion of the catalyst existing as lamellar complex will be determined, at least in part, by the nature of the carbon employed and by the relative proportions of alkali metal and carbon. Furthermore, if desired, the catalyst may contain free carbon. If desirable, the catalyst may contain free alkali metal.

The carbon will preferably be wholly or partly in the form of natural or synthetic graphite. However, other forms of carbon may be employed providing that they are capable of reacting with an alkali metal to form a lamellar complex. Thus there may be employed forms of carbon which contain graphite in microcrystalline form together with carbon of a nature which does not form lamellar complexes with alkali metals.

Usually the reaction pressure will be superatmospheric, preferably being in the range 50 to 4000 lbs./sq. in. gauge. The combination of polymerisation conditions employed will be selected to favour the formation of 4-methylpentene-1.

The process may be carried out either in the presence or absence of a solvent. Preferred solvents are hydrocarbon, for example normally liquid paraffin; normal heptane is a particularly suitable solvent.

Preferably the propylene employed as feedstock will be free of water. In general, the propylene should have a water content not greater than 0.001% by wt.; in comparison with a process using propylene saturated with water the improvement in yield of propylene dimer, using suitable reaction conditions is usually quite marked and in certain cases may be as much as 30% by wt.

It will be apparent that it is essential to avoid conditions which would lead to the presence of a slug of water in liquid phase reaching the polymerisation catalyst.

Usually the contact time employed in the polymerisation reaction will be considerably less than 12 hours; usually, also, less than 3 hours. Preferably it will be less than 1 hour. Usually contact time will be above 1 minute; usually, also, above 5 minutes. A suitable contact time is of the order of 30 minutes.

Preferably the propylene employed as feedstock will be free of allene and of methylacetylene. In general, if these compounds are present they should constitute in total less than 0.02% by weight of the propylene.

Preferably propylene employed as feedstock for the process of this invention is treated, before use, for the reduction of allene and/or methylacetylene content by selective hydrogenation over a supported nickel catalyst, for example, nickel-on-sepiolite.

The propylene should be free of oxygen; if present it should not constitute more than 5 p.p.m. by wt. based on propylene.

If desired the propylene may be employed in the presence of a gas which is inert under the conditions of the reaction. Thus nitrogen, methane, ethane or propane may be present in the feedstock.

The reaction may be carried out batchwise or continuously.

The catalyst may be employed as a fixed bed, fluidised bed or as a slurry in solvent or in one or more of the reaction products.

According to one aspect of this invention there is provided a process which comprises maintaining propylene in contact with a catalyst consisting of or containing a lamellar complex of sodium and carbon and having the formula, $NaC_{64}$ recovering from the product a $C_6$ fraction and recovering from the $C_6$ fraction 4-methylpentene-1.

Product recovery will usually be achieved by distillation. Usually distillation will be carried out in a column of at least 60 theoretical plates, suitably circa 100 theoretical plates.

The invention is illustrated but not limited with reference to the following example.

*Example*

Graphite (128 grams, 10.7 gram atoms) was dried at 400° C. and 0.1 mm. for 30 minutes. The heating was continued at 400° C. under an atmosphere of pure dry nitrogen and to the stirred graphite was added sodium (3.8 grams, 0.166 gram atoms). The mixture was stirred under these conditions for 30 minutes.

The catalyst so formed was charged to a stainless steel reactor to form a cylindrical bed 20 cms. in length and of 4 cms. diameter. The reactor was operated in vertical downflow using propylene at 1500 lbs./sq. in. gauge; reaction temperature was 126° C. and the liquid hourly space velocity of propylene was 0.416.

The $C_6$ hydrocarbons were recovered from the product by distillation; product analysis of the $C_6$ fraction was:

4 methylpentene-2 _____ 43.9
2 methylpentene-2 _____ 3.8
4 methylpentene-1 _____ 51.3

It is a further feature and an advantage of the present invention that the process lends itself to a commercially attractive route to 4-methylpentene-1 using a slurry type catalyst.

We claim:

1. A process for the production of 4-methylpentene-1 comprising: contacting propylene for between about five and about sixty minutes with a catalyst comprising a lamellar complex of sodium and graphite and having the formula $NaC_{64}$, at a temperature of below about 140° C.

2. A process as specified in claim 1, in which the contact time of propylene with catalyst is about thirty minutes.

3. A process as specified in claim 1 in which the reaction temperature lies in the range 100–140° C.

4. A process as specified in claim 1 in which the reaction pressure lies in the range 50–4000 lbs./sq. in. gauge.

References Cited in the file of this patent

UNITED STATES PATENTS

| | | |
|---|---|---|
| 2,881,234 | Esmay et al. | Apr. 7, 1959 |
| 2,965,624 | Anderson | Dec. 20, 1960 |

FOREIGN PATENTS

| | | |
|---|---|---|
| 825,902 | Great Britain | Dec. 23, 1959 |